Dec. 6, 1955 W. A. PARSONS 2,725,818
TYPE WHEEL SETTING MEANS IN CALCULATING MACHINE
Filed June 20, 1952 6 Sheets-Sheet 1

INVENTOR,
Wharton A. Parsons
BY
ATTORNEY.

Dec. 6, 1955 W. A. PARSONS 2,725,818
TYPE WHEEL SETTING MEANS IN CALCULATING MACHINE
Filed June 20, 1952 6 Sheets-Sheet 2
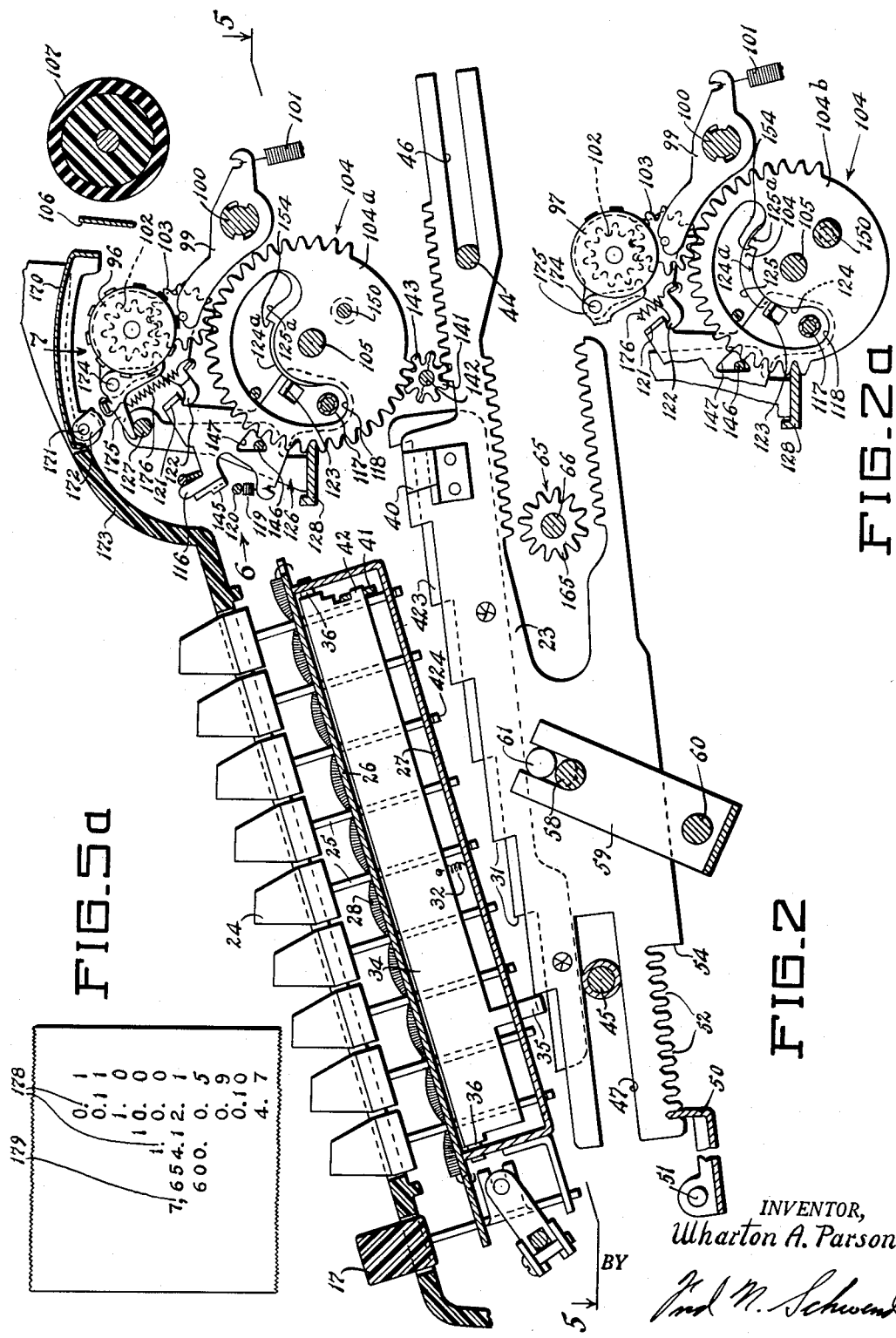
INVENTOR,
Wharton A. Parsons
BY
ATTORNEY.

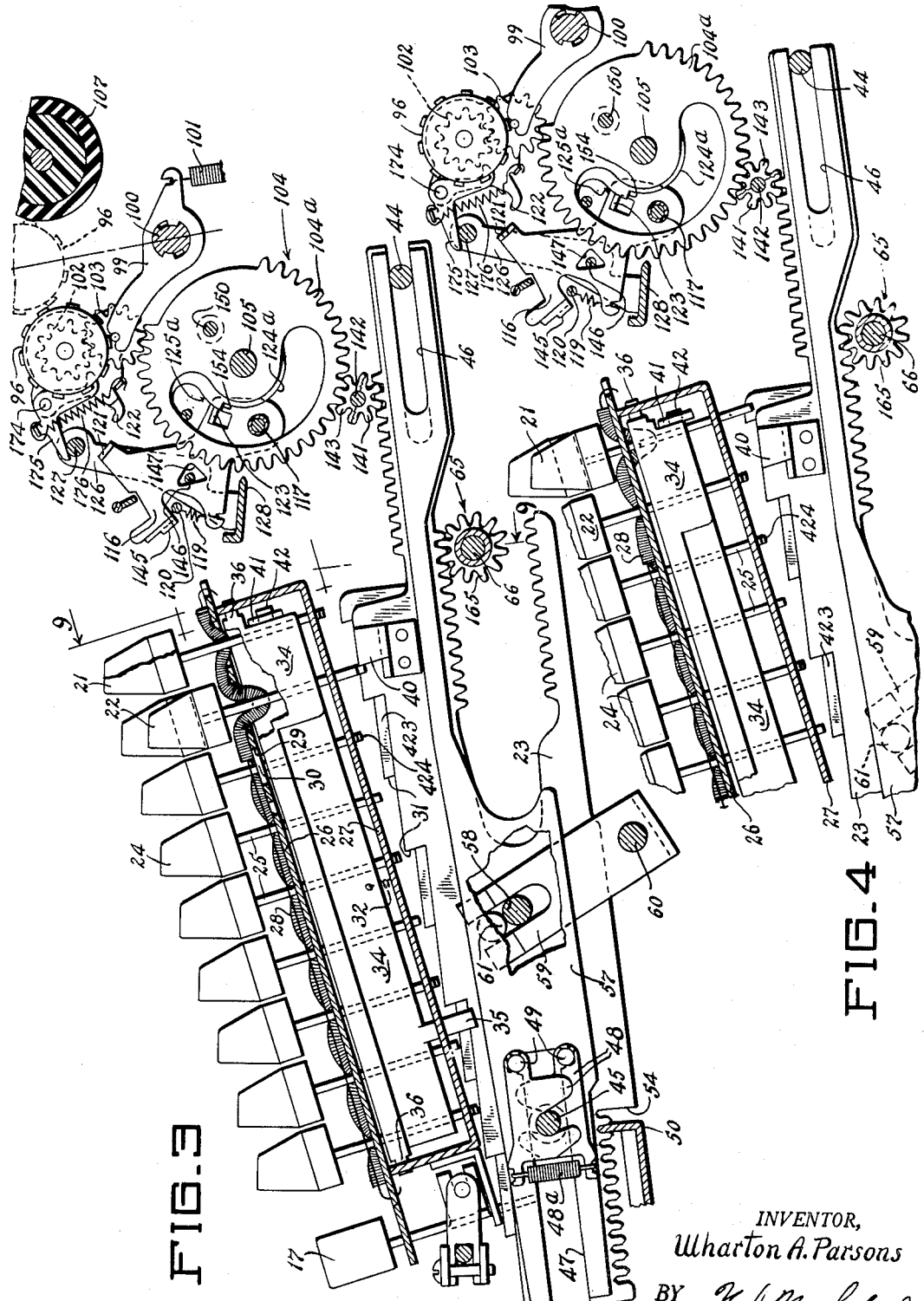

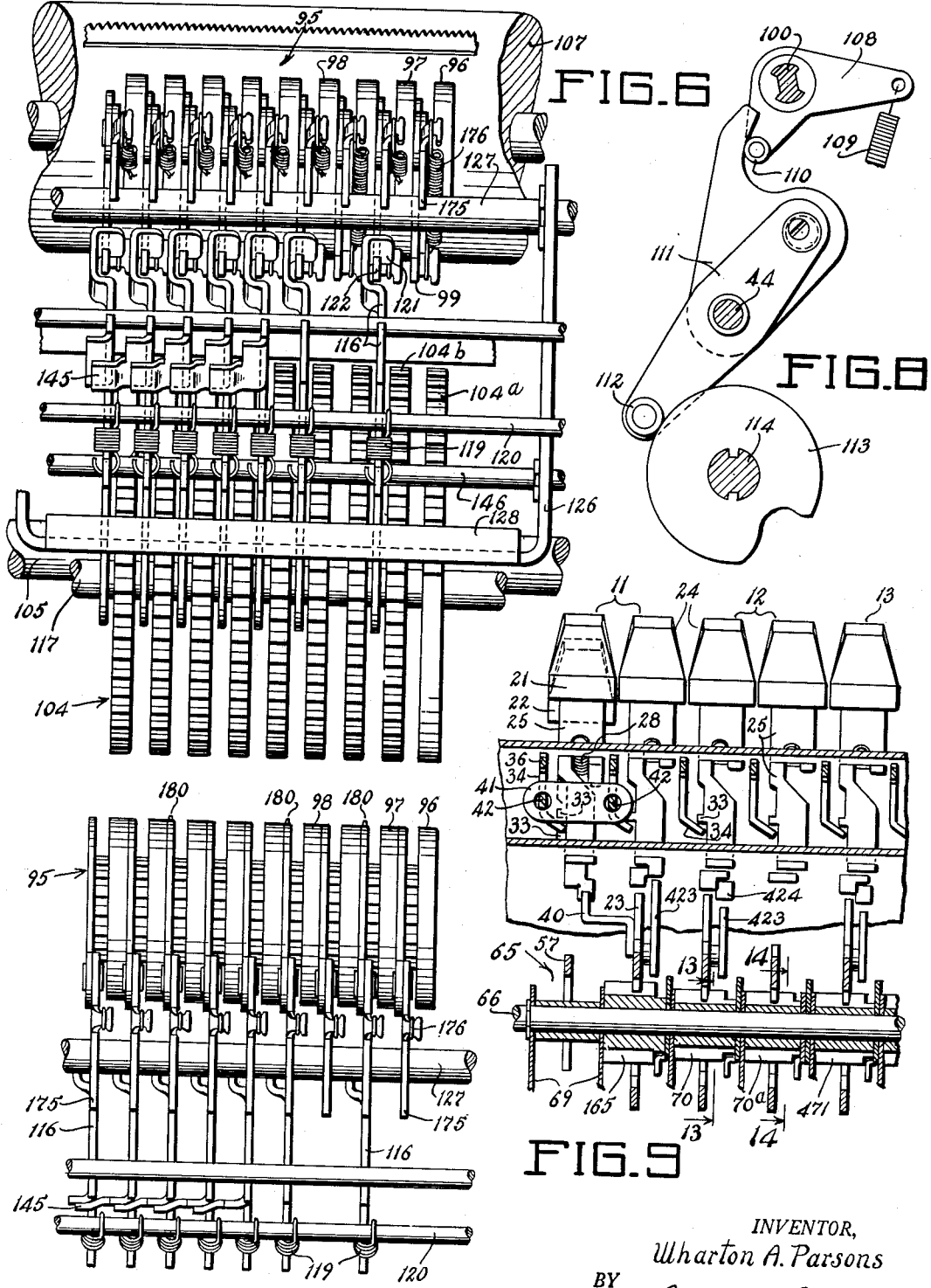

Dec. 6, 1955  W. A. PARSONS  2,725,818
TYPE WHEEL SETTING MEANS IN CALCULATING MACHINE
Filed June 20, 1952  6 Sheets-Sheet 6
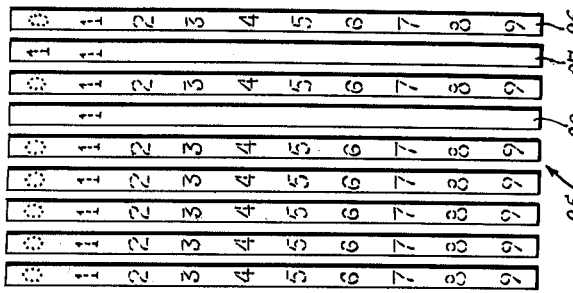
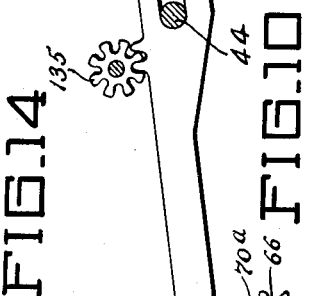
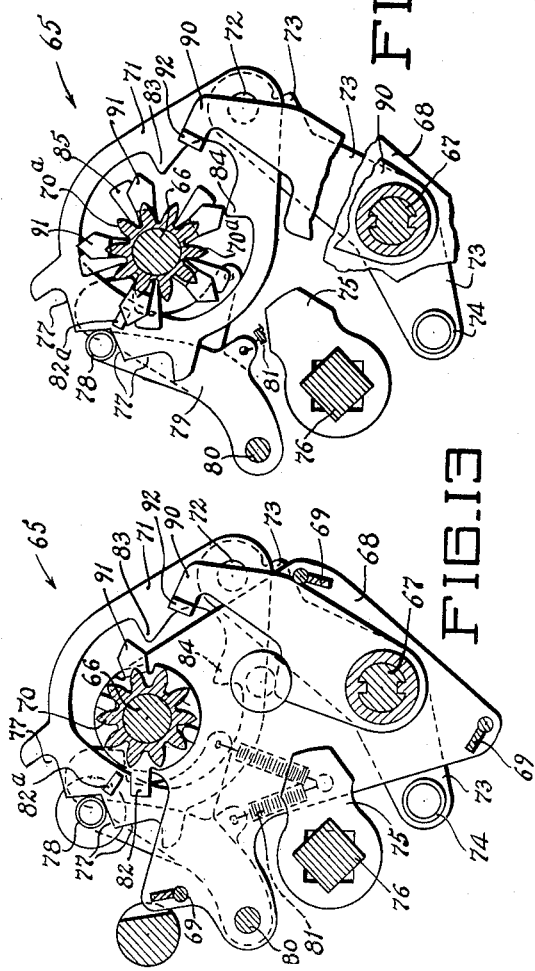
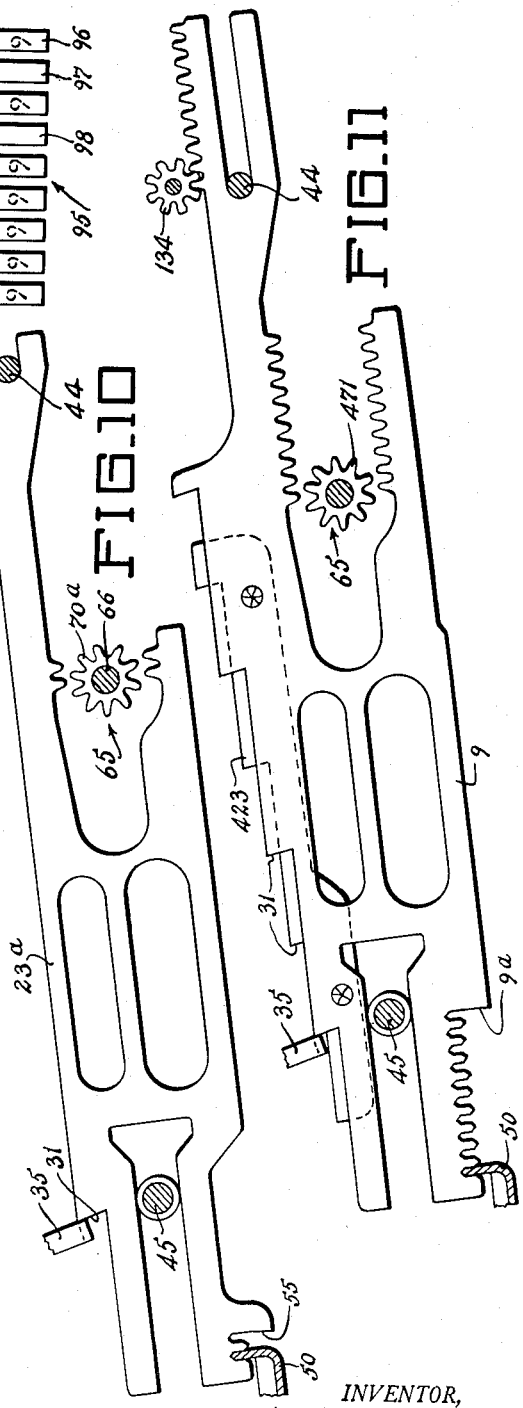
INVENTOR,
Wharton A. Parsons
BY
ATTORNEY.

United States Patent Office 2,725,818
Patented Dec. 6, 1955

2,725,818

TYPE WHEEL SETTING MEANS IN CALCULATING MACHINE

Wharton A. Parsons, La Canada, Calif., assignor to Clary Corporation, a corporation of California Application June 20, 1952, Serial No. 294,567

3 Claims. (Cl. 101—93)

Statement of invention

This invention relates to calculating machines of the type embodying printing instrumentalities capable of recording amounts and results entered into and/or computed by such machines.

The invention is specfically directed to machines capable of computing in non-decimal or combined decimal and non-decimal systems of computation. Such machines are found desirable in computing in various foreign currency systems, i. e., English, Indian, Arabic, etc., as well as in such non-decimal systems as feet-inches systems, twelfths, fractions systems, etc.

The modification of standard decimal machines embodying differentially movable racks and associated type elements in order to compute and print according to a non-decimal system is, in general, a simple matter, where the movable elements need be merely modified to include extra increments of travel with associated additional type characters. However, this is not the case where the dimensions or movements of certain parts of the apparatus cannot be conveniently modified.

In the well-known Clary adding and cash registering machines, the basic printing mechanism of which is shown and described in the Robert E. Boyden Patents 2,492,263 and 2,583,810 issued on December 27, 1949, and January 29, 1952, respectively, the printing mechanism includes type wheels having ten type characters spaced therearound and carried by individual arms which swing the type wheels against the platen during printing operations. Space and design considerations render it difficult to change the diameters of such type wheels or to include more than ten type characters on each wheel in order to modify the machine to compute according to numeral systems other than the decimal system.

Accordingly, the principal object of the present invention is to modify a normally decimal type printing calculating machine to compute and print according to different numeral-base systems.

Another object is to utilize a standard decimal printing type mechanism to print according to a non-decimal system.

A further object is to differentially control type elements in different denominational orders of a printing mechanism by a single actuating member.

A further object is to differentially set ten-digit type elements in adjacent denominational orders by a single rack according to a non-decimal radix or numeral base system.

A still further object is to provide a simple printing mechanism for differentially controlling two type elements by a single actuating rack.

The manner in which the above and other objects of the invention are accomplished will be readily understood on reference to the following specification when read in conjunction with the accompanying drawings, wherein:

Fig. 2 is a longitudinal sectional view through the "pence" section of the machine, and is taken substantially along the line 2—2 of Fig. 1.

Fig. 2a is a fragmentary sectional view through the left-hand pence section of the printing mechanism.

Fig. 3 is a sectional view similar to Fig. 2, but is taken through the right-hand order of the pence section, and is taken substantially along the line 3—3 of Fig. 1, this view showing the pence rack and respective printer elements in their "tens" registering positions.

Fig. 4 is a partial section similar to that of Fig. 3, but illustrating the pence rack and printer elements in their "elevens" registering position.

Fig. 5a illustrates a paper tape having various values printed thereon by the machine.

Fig. 6 is a front view illustrating the various elements of the printing mechanism and is taken substantially in the direction of the arrow 6 in Fig. 2.

Fig. 7 is a plan view of the printing mechanism and is taken substantially in the direction of the arrow 7 in Fig. 2.

Fig. 8 is an elevational view illustrating part of the operating mechanism for printer control shaft.

Fig. 9 is a transverse sectional view taken substantially along the line 9—9 of Fig. 3, illustrating the keyboard and its relation to the accumulator.

Fig. 10 is an elevational view illustrating the higher order "shillings" rack.

Fig. 11 is an elevational view illustrating one of the "pounds" racks.

Fig. 12 is a view illustrating in developed form the various type wheels.

Fig. 13 is a transverse sectional view taken along the line 13—13 of Fig. 9 illustrating the lowest shilling order of the accumulator mechanism.

Fig. 14 is a view similar to that of Fig. 13 but taken along the line 14—14 illustrating the highest shilling order of the accumulator mechanism.

General construction

The particular embodiment of the invention disclosed herein is adapted to the well-known commercially available Clary adding machine which is generally disclosed in the aforementioned Boyden Patent No. 2,583,810. The particular accumulating mechanism of the Clary adding machine, as applied to a fully decimal type machine, is generally disclosed in the patent to E. P. Drake, No. 2,472,696, issued on June 7, 1949.

Since the machine to which the present invention is applied is generally disclosed in the above-noted Boyden and Drake patents, only those portions of the machine which relate to the present invention will be disclosed in detail. Reference may be had to the foregoing patents for disclosure of a complete adding machine, including mechanism not specifically disclosed herein. However, it is to be understood that the invention is not limited to the particular machine disclosed in said patents.

Figure 1:
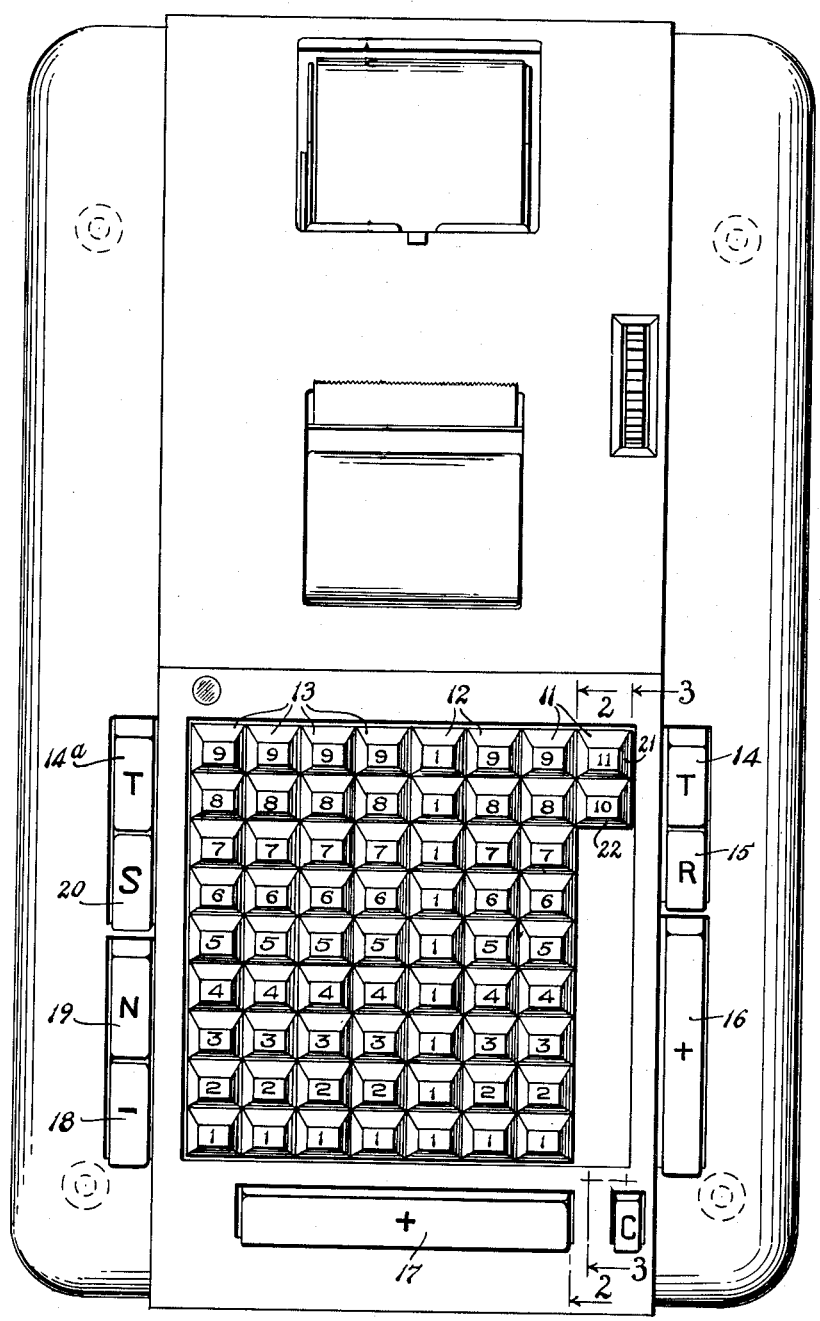
Fig. 1 is a plan view of an adding machine embodying a preferred form of the present invention.

Referring to Fig. 1, the machine of the present invention is capable of computing according to the British pounds sterling system, and for this purpose the keyboard is divided into three groups of amount keys, the lowermost group 11 of two banks of keys designating pence, the intermediate group 12 of two banks designating shillings, and the remaining higher group 13 of four banks designating pounds.

The machine also includes a series of control bars arranged around the various amount keys. Included are a pair of motorized total bars 14 and 14a, either of which is effective to cause a totalling operation. Also included are a motorized repeat bar 15, motorized add bars 16 and 17, either of which is effective to cause an add operation, a motorized subtract bar 18, a motorized nonadd bar 19, and a motorized subtotal bar 20.

Keyboard and racks

The keyboard is of the flexible type and each bank of keys, except the right-hand bank of the pence group 11 and the highermost bank of the shillings group 12, comprises a series of nine amount keys ranging in value from 1 to 9. Each amount key, except the "9" key, when depressed acts as a stop to differentially limit forward movement of an aligned drive rack, i. e., 9 (Fig. 11) which both drives the accumulator to enter a value therein, corresponding to the value of the depressed key, and also sets the printing mechanism to print a digit representing such value.

Depression of the "9" key will allow the rack to be driven to its fullest extent of nine increments, whereupon a shoulder 9a thereon will strike an aligner bail 50, the latter being lowered out of engagement with teeth 52 of the various racks during operation of the machine.

The keys 21 and 22 (Figs. 1 and 3) in the right-hand bank of the pence group 11 cooperate with the remaining keys of the left-hand bank of pence keys to control a single eleven increment rack 23.

Each of the various amount keys comprises a keytop 24 of plastic or similar material and a key stem 25 guided in aligned slots formed in a top key plate 26 and a bottom key frame plate 27. The keys in each bank are yieldably urged upwardly by a tension spring 28 extending the length of the keyboard and suitably attached at opposite ends to the top plate 26. This spring rests on cross ribs 29 (Fig. 3) formed across slots 30 in the key plate and extends through openings (not shown) formed in each of the key stems.

Upon depression of a key, the adjacent portions of the spring are stretched and extend downwardly through the adjoining slot 30 while the lower extremity of the key stem in most cases is positioned in the path of a respective one of a plurality of shoulders 31 formed on the associated rack.

Means are provided for locking any of the amount keys in depressed position and for releasing any previously depressed key in the same bank. For this purpose, each key stem is provided with a cam lobe 33 (Fig. 9) which, when the key is depressed rocks a locking bail 34 pivoted at either end thereof to the front and rear walls of the key frame by trunnion bearings 36. At the bottom of the key stroke the cam lobe 33 passes below the locking bail, allowing the same to retract partially under the action of a spring 32 to a position where it latches the key depressed.

A zero block 35 is formed on each locking bail 34 and when no key in any one bank is depressed, the bail 34 of that order will be spring held in an extreme inwardly rocked position so that its zero block lies directly in front of one of the stop shoulders 31 on the associated rack, thereby preventing forward movement of the rack during the ensuing operation of the machine. However, when any amount key is depressed and latched down, the locking bail will be held outward sufficiently to retain its zero block 35 out of the path of the aligned rack.

It will be noted that each rack is in two parts, including an offset piece 423 integral with the main portion of the rack. Alternate ones of the rack shoulders 31 are formed on the offset piece 423 and are engaged by offset tips 424 at the lower edges of the associated alternate amount key stems.

Referring in particular to Figs. 2, 3 and 9, an extension 40 is securely mounted on the pence rack 23 in alignment with the right-hand order or bank of pence keys, and such extension is adapted to be blocked by the "10" key 22 upon depression of the latter, Fig. 3 illustrating the rack as advanced ten increments into a position limited by the key stem of the "10" pence key 22.

The locking bails 34 associated with the two banks of pence keys are operatively connected together through a link 41 pivotally connected at opposite ends thereof to extensions 42 protruding from these two locking bails. Thus, depression of the "10" or "11" key will, through the link 41, cause the locking bail associated with the left-hand bank of pence keys to retract its zero block 35 to permit forward movement of the rack 23 until arrested under control of either key.

It should be noted that the "11" key is effective only to retract both locking bails, permitting the rack 23 to be advanced to its fullest extent, i. e., eleven increments, whereupon a shoulder 54 thereon engages the aligner bail 50.

The various racks are guided for fore and aft movement by shafts 44 and 45 slidably embraced by slots 46 and 47, respectively, formed in each of the racks.

Means are provided for yieldably driving the racks forwardly to their differentially arrested positions and thereafter returning the same during each cycle of the machine, and for this purpose the shaft 45 is moved laterally, i. e., fore and aft of the machine by means not shown.

A yieldable connection is provided between the shaft 45 and each of the racks excepting the pence rack 23. For this purpose, the shaft is connected to each of the foregoing racks and to a special drive rack 57 by a pair of opposed drive elements 48 pivotally carried by the shaft and having rollers 49 which normally engage in lateral depressions formed at the closed end of the respective slot 47. A spring 48a urges the elements outwardly to normally hold the rollers 49 in the depressions in their slot 47 until the respective rack is arrested by the zero block 35, liner bail 50, a depressed amount key or by the associated accumulator element during totalling operations as will appear hereinafter.

Means are provided for locking the various racks in their normal home positions shown in Figs. 2, 10 and 11, and also in their various digitized positions during the printing phase of a machine cycle. For this purpose the algiiner bail 50 is pivotally mounted on the framework of the machine by trunnion bearings, one of which is shown at 51. The bail 50 is movable into any one of a series of centralizing notches 52 formed along the lower forward edges of the various racks. Means (not shown) operates to rock the locking bail 50 into engagement with one of the notches 52 in each bail during the printing operation and at the end of each machine cycle.

It should be noted that in the case of the rack 23a (Fig. 10) associated with the highermost bank of the shillings group of keys, the locking bail 50 is effective to engage a blocking shoulder 55 on the rack when the latter moves one increment as an incident to depression of any key in that bank, there being no key stem engaging shoulders on this rack.

The rack drive shaft 45 is advanced the equivalent of nine increments of travel of the various racks, and is consequently effective to drive all of the racks, excepting the pence rack 23, the full extent of their movement. In order to effect an eleven increment movement of the latter rack 23, a lever system is provided operated by the rack 57, the latter being unaffected by any of the keys or zero blocks. However, the rack 57 is slidably mounted on the cross-shafts 44 and 45 and is yieldably driven by the latter shaft 45 in the same manner as the other racks.

A stud 58 extending from the side of rack 57 engages a slot formed in one arm of a bail 59 (see also Fig. 5) pivoted on a stationary cross rod 60. The other arm of the bail 59 (Fig. 2) is also provided with a slot embracing a second stud 61 secured to the side of the rack 23. The stud 61 is located above the level of stud 58 so that upon a full nine increment movement of the rack 57, the pence rack 23 will normally be driven eleven increments when allowed to do so upon depression of the "11" pence key 21.

Accumulator

The accumulator, generally indicated at 65 (Figs. 2, 3, 4, 10, 11, 13 and 14) is of the two-direction subsequent transfer type adapted to be moved upwardly into engagement with the drive racks, as illustrated in Figs. 3 and 4, to effect additive operations, and to be lowered into mesh with the racks to effect subtractive operations, as shown and described in the above-noted Drake patent. Therefore, the means for engaging and disengaging the accumulator and for effecting tens transfer have only been partly shown herein.

For the pence keys and rack 23, a twelve tooth accumulator gear 165 (Figs. 2, 3 and 4) is provided, the remaining orders of the machine including ten-tooth gears (Figs. 10, 11, 13 and 14), one for each additional rack.

The accumulator in general comprises a pair of parallel shafts 66 and 67, both rotatably mounted in bearings formed in a series of ordinally spaced brace plates 68 rigidly held in spaced relation to each other by suitable interlocking combs 69 well known in the art. The shaft 66 carries the aforementioned accumulator gears like 165.

As the pence accumulator gear 165 moves through one revolution or twelve tooth spaces as a result of accumulating twelve pence, it conditions a transfer mechanism to subsequently enter one digit into the lower order shillings accumulator gear 70 (Fig. 9). The latter gear has ten teeth thereon and upon completion of a ten tooth advance thereof, it conditions the transfer mechanism to enter one digit into the higher order shillings gear 70a (Fig. 14). The latter gear is effective, upon every two-tooth advance thereof, to condition the transfer mechanism to enter a digit into the lowermost order pounds accumulator gear 471 (Fig. 9).

The transfer mechanism comprises a transfer pawl 71, one located in each order of the machine and capable of rotating its associated gear an increment of one tooth space in either direction, depending upon the type of operation being performed. Each pawl surrounds its associated accumulator gear and is pivoted at 72 to a cam follower lever 73, the latter being pivotally supported on the lower accumulator shaft 67. A roller 74 on the lever 73 is adapted to be engaged by an aligned one of a series of transfer cams 75 located in a helical arrangement around a transfer shaft 76. The transfer pawl 71 is provided with three detents 77, the central one of which is normally engaged by the roller 78 of a centralizer lever 79. The latter is pivoted at 80 to the adjacent brace plate 68 and is pressed against its pawl by a spring 81 extending between the centralizer and a suitable part of the brace plate so as to normally hold the pawl in its central illustrated position as shown in Figs. 13 and 14 where it is ineffective to cause a transfer upon actuation of its cam follower lever 73 by the aligned transfer cam 75.

Referring to Fig. 13, representative of the lowermost order of the shillings order and all of the pounds orders, as the accumulator gear rotates counterclockwise from its "9" position (not shown) to its illustrated "0" position during an adding operation, a transfer ear 82 integrally attached thereto moves into engagement with an ear 82a formed on the associated transfer pawl 71 which is located in the next arithmetically higher order, thus rocking the pawl downwardly about its pivot 72. As the pawl approaches its lowermost position the associated centralizer 79 becomes effective to fully move the pawl into and hold it in such position.

In the fully conditioned position (not shown) of the transfer pawl, a transfer tooth 83 is lowered into a position directly behind a tooth of the associated accumulator gear. In the subsequent transfer phase in which the cams 75 are rotated through a complete revolution, the cam follower arms 73 are rocked counterclockwise to advance the transfer pawls. Thus, the tooth 83 will engage and rock the associated accumulator gear one tooth space in a counterclockwise or additive direction.

Likewise, during a subtractive operation, and when the accumulator gear rotates clockwise from its "0" position to a "9" position, the transfer ear 82 thereof will strike the ear 82a of the transfer pawl, moving the latter into an upper position wherein the centralizer 79 engages the lower one of the three detents 77. Thus, a second transfer tooth 84 on the transfer pawl is positioned opposite a tooth near the bottom of the accumulator gear so that when the pawl 71 is subsequently moved forward during the transferring phase, the tooth 84 will advance the gear one tooth space in a subtractive direction.

Referring to Fig. 14, it will be noted that the accumulator gear 70a associated with the higher shillings order is provided with five equally spaced transfer conditioning teeth 85. Thus, one of the transfer teeth 85 will be effective to condition the associated transfer pawl 71 in an upper or lower condition (depending upon the type of operation being performed) upon every second tooth advancement of this higher shilling accumulator gear. Therefore, a transfer will be effected into the lowermost pounds order upon each accumulation of twenty shillings.

It should be noted that during additive, subtractive and totalling operations the accumulator will be disengaged from the racks, i. e., it will be returned to its neutral position illustrated in Figs. 2, 10 and 11, after forward advancement of the racks and prior to return of the racks to their home positions. Therefore, at the end of the digitizing phase of each cycle, the transfer pawls 71 in all orders that are to receive a transfer will be conditioned or located in an upper or lower position, depending upon the type of operation, and the gears will be completely de-meshed from their associated racks.

In order to return the various accumulator gears to zero positions upon totaling or subtotaling operations of the machine, a plurality of zero stop arms 90 (Figs. 13 and 14) are securely keyed on the lower shaft 67, one for each accumulator gear. The latter arms cooperate with zero stop lugs 91 integral with the various accumulator gears. For this purpose, during totaling and subtotaling operations, the shaft 67 is rocked counterclockwise to position lateral ears 92 on the various zero stop arms 90 directly in the path of such lugs 91.

All of the accumulator gears excepting the highermost shillings order gear 70a (Fig. 14) are provided with single zero stop lugs 91. However, the gear 70a is provided with five such lugs, equally spaced about the gear, whereby to arrest the highermost shillings order gear in the next adjacent one of five positions.

Printer

The printer comprises a series of numeral printing dials or type wheels generally indicated at 95 (Figs. 2, 3 and 4), there being one type wheel for each rack except in the case of the pence group where the two right hand pence type wheels 96 and 97 (Figs. 6, 7 and 12) are jointly controlled by the single pence rack 23. Each type wheel except the higher order pence wheel 97 and the higher order shillings wheel 98 is provided with a series of ten equally spaced type characters therearound ranging progressively in value from zero to nine. These wheels are so connected to their associated racks that each will print a digit corresponding in value to the value of the amount key depressed in the associated key bank, or to the numerical position to which the rack is moved in its forward stroke. The means for connecting the various type wheels to the respective ones of their racks will be described in detail hereinafter.

Each type wheel 95 is rotatably mounted on an associated carrier arm 99 which is loosely keyed on a printer control shaft 100 and is spring-urged clockwise by a tension spring 101 extending between the arm and a suitable portion (not shown) of the machine frame. Each type wheel has integrally secured thereto a gear 102 permanently enmeshed with a gear 103 also rotatably mounted on the associated carrier arm. When the arms 99 are held in their normal positions illustrated in Fig. 2 by the shaft 100, the gear 103 meshes with an aligned one of a series of idler gears 104 rotatably mounted on a stationary cross shaft 105. The latter gears are continuously entrained with respective ones of the drive racks through a series of pinion assemblies to be described presently.

At approximately the midpoint in a machine cycle, and after the racks have digitized the accumulator, the printer control shaft 100 is rocked clockwise, permitting the various springs 101 to rock those type carrier arms 99 which are otherwise allowed to do so, and thus carry the type wheels forwardly into contact with a printing ribbon 106 and a paper strip (not shown) carried around the periphery of a platen 107 whereby the value registered on the type wheels will be printed onto the paper.

A cover 170 is located directly over the various type wheels to prevent dust and dirt from dropping or settling on the wheels when the machine is at rest. The cover is pivoted at 171 to a part 172 of the machine frame and fits within an opening formed in a general machine casing 173. Suitable means (not shown) operate to raise the printer cover 170 from its position illustrated in Fig. 2 just prior to movement of the type wheels toward the platen. Such means is effective to again return the printer cover to its lower illustrated position after the printing operation.

Means are provided for detenting all type wheels in their registered positions during movement thereof into printing contact with the paper tape and during return thereof. Pivoted at 174 on each arm 99 is a centralizer 175 adapted to engage the respective gear 102. A spring 176 extending between the centralizer and the arm 99 urges the centralizer toward engagement with the gear but this action is prevented by the stationary cross rod 127 which is engaged by a tail on the centralizer. However, as the arm 99 is rocked toward the platen the tail of the centralizer recedes from the cross rod 127, enabling the spring 176 to engage the centralizer with the gear. Upon return of each arm 99 to its initial position the tail of the respective centralizer will strike the rod 127 to return the same to disengaged condition.

In order to distinguish between the pence, shillings and pounds amounts on the printed tape, punctuation marks in the form of periods 178 (Fig. 5a) are printed between the pence and shillings amounts and between the shillings and pounds amounts. Also, a comma 179 is printed between the hundreds and the thousands denominations in the pounds amounts. For this purpose, punctuation type characters 180 (Fig. 7) are formed on the carrier arms 99 which carry the higher order pence type wheel, the higher order shillings wheel and the hundreds denomination pounds wheel.

For the purpose of rocking the shaft 100 to enable printing by the various type wheels 95, the latter shaft is supported by suitable bearings (not shown) carried on the machine frame, and is secured to a bell crank 108 (Fig. 8) urged clockwise by a spring 109 and provided with a roller 110 held against a camming lever assembly 111 pivoted on an extension of the stationary shaft 44. A roller 112 on the lower end of the lever assembly rides on the periphery of a printer control cam 113 keyed on a drive shaft 114. The latter is rotated a complete revolution in a counterclockwise direction during each machine cycle to drive the various machine instrumentalities and thus as the shaft 114 rotates through approximately 180° of its cycle it will permit the lever assembly 111 and bell crank 108 to be rocked by spring 109 to effect the printing operation.

Figure 5:
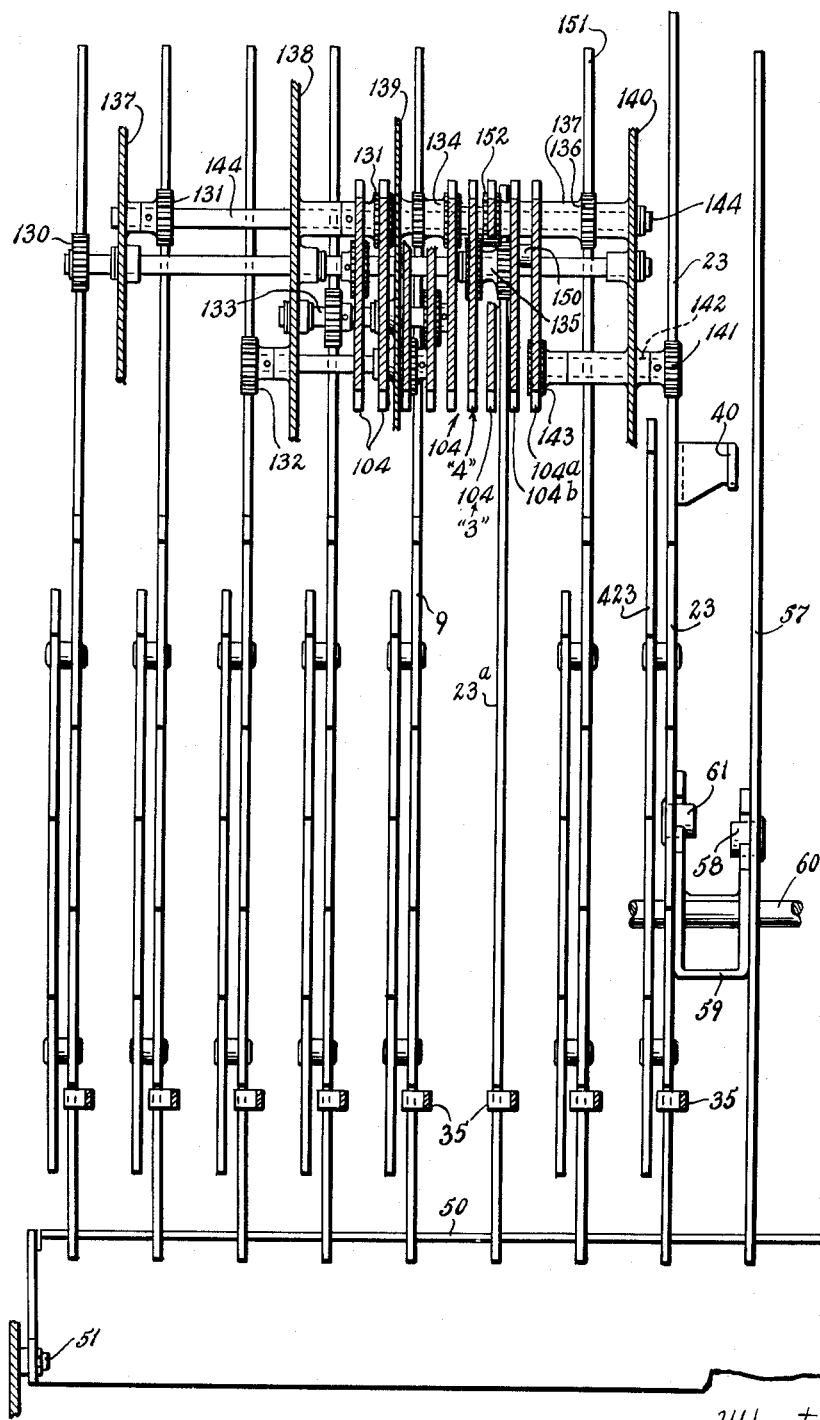
Fig. 5 is a sectional plan view taken substantially along the line 5—5 of Fig. 2, illustrating the various racks and their connections to their respective printer elements.

Describing now the means for connecting the various idler gears 104 to their associated drive racks in order to register the type wheels in accordance with the numerical positions to which their respective racks are moved, reference is had particularly to Fig. 5. A plurality of pinion assemblies are journalled on various stationary frame plates 137–140, inclusive, and are arranged to entrain the various idlers 104 with their respective drive racks. For example, the pence rack 23 meshes with a gear 141 fixed to a shaft 142 to which is also fastened a gear 143 meshing with the right-hand idler 104a (see also Figs. 2, 3 and 4). In accordance with the present invention, and as will be described hereinafter, the two right-hand idlers are both driven from the pence rack 23. Similarly, the lower order shillings rack 151 in the second order from the right meshes with pinion 136 integral with a hollow shaft 137, rotatably mounted on a shaft 144, and carrying a second pinion 152 meshing with the number "3" or lower shillings order idler 104. The rack in the third or highermost shillings order is connected by a pinion assembly 135 to the number "4" idler. The rack in the fourth order is connected by pinion assembly 134 to the number "5" idler. The rack in the fifth order is connected by pinion assembly 133 to the "6" idler. The rack in the sixth order is connected by pinion assembly 132 to the number "7" idler. The rack in the seventh order is connected by pinion assembly 131 (including shaft 144) to the number "8" idler, and the last rack is connected by pinion assembly 130 to the highermost or number "9" idler.

Means are provided for preventing printing of zeros to the left of the highermost significant order of the pounds group, as well as preventing printing of zeros in the tens orders of the pence and shillings groups. For this purpose, a latch 116 (Figs. 2, 3, 4, 6 and 7) is provided for each carrier arm 99 of the pounds type wheels and of the left-hand pence and shillings type wheels 97 and 98, respectively. No latches are provided for the right-hand pence and right-hand shillings type wheels, said wheels being free to print zeros except when otherwise digitized as hereinafter described. The various latches 116 are pivoted on a cross rod 117 extending through control slots 118 in the various idler gears 104. The latches 116 are urged clockwise by short springs 119 extending between the latches and a cross rod 120. An ear 121 on each of the latches is arranged to overlie a foot 122 on the associated carrier arm 99 when the associated drive rack is located in its zero or home position shown in Fig. 2. For this purpose, an ear 123 is struck out from each latch 116 and normally coacts with a concentric surface 124a of the slot 118 (Fig. 2a) in the associated idler 104 when the rack is in its home position. Upon movement of the various racks and their associated idlers 104 to positions other than zero, a second raised concentric surface 125a will be presented below the ear 123, thus holding the latch outward, as shown in Figs. 3 and 4, in a position ineffective to engage and latch its respective carrier arm 99.

Means are provided for initially moving all the various latches outwardly to their positions illustrated in Fig. 3 just prior to digitation of the racks and their idlers and for thereafter allowing them to retract under the action of their springs 119. For this purpose, a centralizer bail 126 is swung on a stationary cross rod 127 and is provided with a bail portion 128 adapted to engage between adjacent teeth on the various idlers 104. Means (not shown) are provided for rocking the bail 126 outward (counterclockwise) into its position shown in Fig. 3 during movement of the racks, and for retracting the same into locking condition, as shown in Figs. 2 and 2a at the end of a machine cycle and during the printing portion of each cycle. A cross rod 146 is carried by the legs of the locking bail 126 and extends through openings 147 in the various latches 116. Thus, as the centralizer 126 is rocked outward to permit rotation of the various idlers 104, the rod 146 will pick up the various latches, rocking them counterclockwise to move the respective ears 123 thereof outward and slightly above the levels of the concentric surfaces 125a of the idlers 104, thus permitting free movement of the various idlers 104 along with the racks.

At the start of the printing phase of a machine cycle and just before the cam 113 (Fig. 8) enables spring 109 to rock the control shaft 100 clockwise, the centralizer bail 126 is retracted, allowing the latches 116 to be rocked clockwise by their springs until engaged by the respective surfaces 124a or 125a of the idlers 104, depending upon the setting of the latter. Thereafter, the bail 126 returns and all latches engaged by the surface 125a will be held out, thereby permitting the respective arm 99 to move its type wheel into printing contact.

Referring to Figs. 6 and 7 in particular, it will be noted that various ones of the printer control latches 116 are provided with overlapping ears 145, each of which overlaps its neighbor to the left. However, the latches 116 associated with the left-hand pence wheel 97 and the left-hand shillings type wheel 98 are trimmed off so that they do not bear the aforementioned overlapping relationship with each other and with the lower order pounds printer control latch.

Although the pounds latches 116 have no effect on either the shillings or the pence latches, whenever any such pounds latch is held outward by the raised control surface 125a of its associated idler gear, all the remaining pounds latches to the right will likewise be held outward by virtue of the overlapping ears 145, to enable printing of any zeros appearing in such right-hand pounds orders. Thus, the resulting printing of the various amounts will appear as in the example illustrated in Fig. 5a.

Since all latches 116 in those orders to the left of the order containing the highermost significant digit registration in the pounds group will be allowed to move into latching condition, printing of zeros in such higher orders is prevented.

In accordance with the present invention and in order to enable control of the two pence type wheels by the single eleven increment pence rack 23, the left-hand pence idler gear 104b (Figs. 2a and 5) is rigidly connected to the right-hand pence gear 104a (Fig. 2) by a stud 150.

It should be noted that the arcuate control surface 124a on the idler 104b extends a greater distance than do the control surfaces 124a on the pounds and shillings idlers 104 (see Fig. 2a). The surface 124a terminates in a shoulder 154 arranged to locate adjacent the ear 123 of the associated higher order pence latch 116 when the two idlers 104a and 104b have been advanced nine increments by their rack 23. When the pence rack 23 digitizes the idler 104a into the "10" and "11" printing positions, the ear 123 will engage the surface 125a as in Figs. 3 and Fig. 4 respectively, thereby enabling printing of the higher order pence type wheel.

As will be seen in Fig. 12, the type wheel 97 is provided with two type characters only, each representing the value "1." These characters are located in alignment with the "0" and "1" characters on the wheel 96, thus the upper character "1" of the type wheel 97 will be normally located at the printing line when the rack 23 is in its home position.

When the idler 104a is digitized for amounts from "1" to "9," inclusive, the ear 123 will continue to engage the surface 124a, thereby preventing the wheel 97 from moving into the printing position, and only the wheel 96 will print. However, when the idler 104a is digitized for "10" pence, the ear 123 will thereafter engage the surface 125a as in Fig. 3 (after the wheels 96 and 97 make a complete revolution) so that the character "1" on the wheel 97 and the character "0" on the wheel 96 will again be at the printing line and the pence latch 116 will be held out, thereby permitting the release of both pence printing wheels to print the value "10." When the rack 23 is advanced to its "eleven" increment position after depression of the "11" pence amount key, the idler 104a and its type wheel 96 will advance an additional increment to register the type character "1" at the printing line and the idler 104b being fixed to 104a will advance the second or alternate character "1" of the type wheel 97 to the printing line and the ear 123 will engage the surface 125a as in Fig. 4. Consequently, the value "11" will be printed.

Subsequently, as the rack 23 moves into its home position the type wheels 96 and 97 will be returned to their respective "0" and "1" positions.

Although I have described my invention in detail in its preferred embodiment and have therefore utilized certain specific terms and language, it is to be understood that the present disclosure is illustrative rather than restrictive, and that changes and modifications may be made without departing from the spirit or scope of the claims appended hereto. For example, the printing mechanism, with certain obvious modifications, could be embodied in machines for computing according to Indian, Arabic and other nondecimal systems of computation.

Having thus described the invention, what I desire to secure by United States Letters Patent is:

1. In a multi-denomination computing machine, the combination comprising a pair of type bearing wheels located in different denominational orders, each of said type wheels having type characters thereon, the type wheel located in the lowest denominational one of said orders having type characters therearound ranging from "0" to "9" only, means for setting said wheels in different type registering positions, said means comprising a differentially operable actuating device operatively connected to both said wheels for moving said wheels in unison at all times, means for differentially controlling the extent of movement of said device through a number of increments greater than nine, means for independently and bodily moving said type wheels to type printing positions, latch means normally latching said last-mentioned means from moving the said type wheel located in the highest denominational one of said orders to its type printing position, and means on said actuating device forming a control surface effective upon movement of said actuating device through a number of increments greater than nine to maintain said latch means out of latching condition.

2. In a multi-denomination computing machine, the combination comprising a pair of type bearing wheels located in different denominational orders, each of said wheels having type characters thereon, the type wheel located in the lowest denominational one of said orders having type characters thereon ranging from "0" to "9" only, means for rotating said wheels into different type registering positions, said means comprising a differentially operable actuating device operatively connected to both said wheels and effective to rotate said wheels in isochronous manners at all times, means for differentially controlling the extent of movement of said actuating device through a number of increments greater than nine, spring means for independently and bodily moving said type wheels to type printing positions, means responsive to operation of said machine for controlling operation of said spring means, a latch normally preventing the said type wheel located in the highest denominational one of said orders from moving to its type printing position, and means on said actuating device forming a control surface effective upon movement of said actuating device through a number of increments greater than nine to maintain said latch ineffective.

3. In a multi-denomination computing machine, the combination comprising a pair of type bearing wheels located in different denominational orders, the lowermost denomination wheel having type characters therearound ranging from "0" to "9" only, the highermost denomination wheel having a plurality of "1" type characters thereon, means for rotating said wheels into different type registering positions, said means comprising a differential actuating device operatively connected to both said wheels and effective to rotate said wheels in isochronous manners at all times, means for differentially controlling the extent of movement of said actuating device through a number of increments greater than nine, means for independently and bodily moving said type wheels to type printing positions, means responsive to operation of said machine for causing operation of said type wheel moving means, and a device for normally rendering said type wheel moving means ineffective to bodily move the highermost denomination wheel to type printing position, said actuating device forming a control surface effective upon movement of said actuating device through a number of increments greater than nine to maintain said last-mentioned device ineffective.

References Cited in the file of this patent

UNITED STATES PATENTS

| | | |
|---|---|---|
| 1,338,014 | Hart | Apr. 27, 1920 |
| 1,356,916 | Gumprecht | Oct. 26, 1920 |
| 2,346,265 | Mehan | Apr. 11, 1944 |
| 2,476,853 | Fowler | July 19, 1949 |
| 2,501,447 | Lambert | Mar. 21, 1950 |
| 2,506,337 | Boyden | May 2, 1950 |